Figure 1:
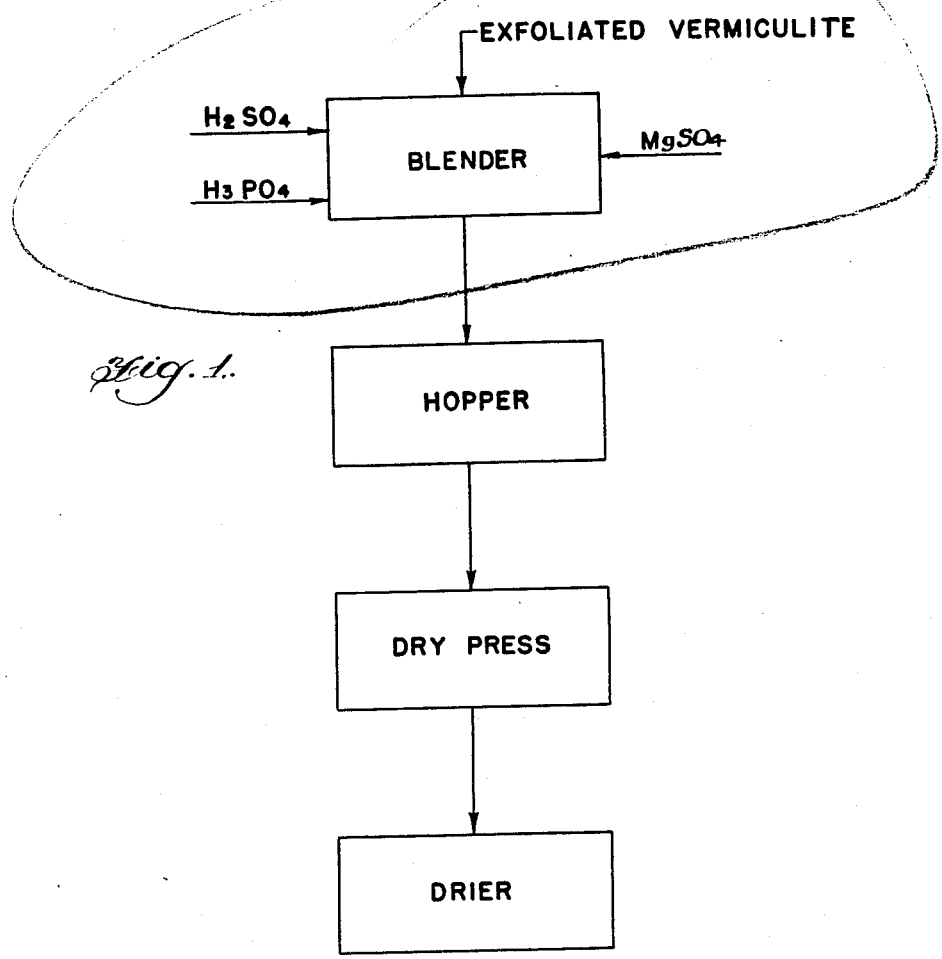

Dec. 29, 1959  J. C. EKEDAHL ET AL  2,919,202
CHEMICALLY BONDED VERMICULITE INSULATING
BLOCKS AND METHOD FOR MANUFACTURING SAME
Filed Aug. 26, 1957

INVENTORS.
John C. Ekedahl
John W. Veale
By Wynn S. Stone, Atty.

United States Patent Office 2,919,202
Patented Dec. 29, 1959

2,919,202

CHEMICALLY BONDED VERMICULITE INSULATING BLOCKS AND METHOD FOR MANUFACTURING SAME

John C. Ekedahl and John H. Veale, Joliet, Ill., assignors to Illinois Clay Products Company, Joliet, Ill., a corporation of Illinois Application August 26, 1957, Serial No. 680,353

4 Claims. (Cl. 106—60)

The invention relates to chemically bonded vermiculite insulating blocks and to methods for their manufacture.

An object of the invention is to provide a chemically bonded exfoliated vermiculite block which has sufficient mechanical strength that it can be shipped and used in furnace construction without previous firing and which also has low hot shrinkage and/or good water resistance.

Another object is to provide a vermiculite block which is less expensive than the well known lime bonded vermiculite asbestos compositions made by filter press methods, and which, like such products can withstand temperatures of 1800°–1900° F. with equal or better shrinkage characteristics on heating or firing.

Another object is to provide a chemically bonded unfired vermiculite brick which will withstand as high and/or higher temperatures than the hand molded "Goulac" (lignin pitch) bonded unfired bricks now on the market and having the further advantage of greater water resistance.

A further object is to provide a dry pressed vermiculite brick which does not require firing to give it adequate strength.

Another object is to provide a chemically bonded vermiculite brick of adequate structural strength having over 80% by weight of vermiculite.

A further object is to provide a simple, commercially practical process of manufacturing vermiculite bricks and like refractory articles.

These and other objects and advantages of the invention can be attained by forming a substantially dry mixture of exfoliated vermiculite having a certain range of particle size and a bonding agent, pressing the mixture in a mold under controlled pressure into bricks or other shaped products, removing the shaped product from the mold and drying.

The vermiculite particles for making a brick should substantially be of the same particle diameter. We have found however, that a commercially satisfactory low density and high porosity brick can be attained by having the particles of the mixture within a range of size or diameter so that 90% of the particles are in a range where the diameter of the larger particles are not over four times the diameter of the smaller particles. The range of particle size preferably is from −3 mesh to +100 mesh.

The exfoliated vermiculite preferably constitutes at least 80% of the mixture, the remainder preferably being the bonding agent.

The preferred bonding agents are liquids. Suitable bonding agents which give satisfactory strength of bond are sulfuric acid, phosphoric acids, sodium silicate and polymerized ethyl silicate. For high temperatures, such as 1900° F., the sulfuric or phosphoric acid is used. For high temperature use combined with exceptional low shrinkage at elevated temperatures the mixture of sulfuric acid and phosphoric acid ($H_3PO_4$) is superior. Polymerized ethyl silicate combined with a mineral acid bonding agent gives a strong silica bond.

The use of phosphoric acid alone gives a bonded block of adequate mechanical strength and of increased water resistance over that produced with sulfuric acid alone. The use of sulfuric acid alone gives a block of adequate mechanical strength but the water resistance is poor. The hot shrinkage (shrinkage of the formed and dried product at elevated temperatures of 1900° F.) using either sulfuric acid or phosphoric acid is relatively poor. The use of both phosphoric acid and sulfuric acid gives a brick having less hot shrinkage than either the sulfuric acid or phosphoric acid brick and considerably greater water resistance than the brick made with sulfuric acid alone. The hot shrinkage can be further reduced by adding magnesium sulfate to the exfoliated vermiculite granules. This is preferably added as an aqueous solution to the exfoliated vermiculite, but magnesium sulfate may also be produced by adding magnesium oxide to the vermiculite granules and then adding sulfuric acid.

The preferred process of making the chemically bonded vermiculite is by dry pressing using a conventional dry press such as the type used for dry pressing clay into the shape of bricks. However, in the dry pressing of clay bricks the pressure used is of the order of 10,000 p.s.i. Such high pressures collapse the structure of the exfoliated vermiculite and destroy its low density.

We have discovered that vermiculite blocks can be made by dry pressing the exfoliated vermiculite granules mixed with the binding agent, the liquid content of the mixture being between approximately 20% to 50% and the pressure between 20 to 200 p.s.i.

The proportion of the ingredients may be varied rather widely.

The vermiculite is preferably present in above 80% by weight of the composition. However, by mixing clay, and/or asbestos with the vermiculite the proportion of vermiculite can be lower but usually with a loss of refractory qualities particularly higher shrinkage in heating or firing, and generally the density is increased.

The sulfuric acid employed can be varied from approximately 5 to 25% (based on 66° Baumé sulfuric acid), and the phosphoric acid from 1% to 10% (based on 75% strength) of the dry aggregate. The amount of acids used is based on the dry vermiculite aggregate.

The preferred range of acids on the dry basis is 2% to 5% phosphoric with 5 to 15% sulfuric acid.

The sulfuric acid is suitably used in 66° Bé. and containing 2 to 5% water. The phosphoric used is preferably the orthophosphoric acid and is suitably used in 75% strength but may be used in other concentrations.

The vermiculite mixture may also contain magnesium sulfate. This may be present in proportion from 0 to 15% by weight of the vermiculite, preferably from 2 to 8%. The addition of magnesium sulfate improves the hot shrinkage, but satisfactory hot shrinkage is obtained without magnesium sulfate.

Likewise magnesium oxide may be used with the vermiculite. It may range from 0–10% on the basis of the vermiculite, but preferably it should be omitted or not used in excess of that required to react with the acid.

The total liquid content of the mixture for satisfactory dry pressing can be from 20% to 40% by weight of mixture and is preferably from 25 to 35%.

The pressures used in dry pressing can be more than 200 p.s.i. but the higher pressure collapses the exfoliated vermiculite to such an extent that the product loses most of its advantage for insulation purposes. At pressures lower than 20 p.s.i. the strength of the brick is too low to allow making a shipping by ordinary means. 30 p.s.i. to 100 p.s.i. gives highly satisfactory results.

After pressing or other forming operation heat must be applied to remove water and complete the reaction. Temperatures in excess of 212° F. will drive off all free water and develop the strength of the material. However, the maximum water resistance is not developed until the block is heated substantially above 212° F. as for example to temperatures of 400° F. and higher. In practice temperatures of 700° F. have been employed. In general it is preferred to keep the temperature below the firing temperature of about 1900° F. at which vitrification and the development of ceramic bonds take place. However, the bricks can be fired if desired, and is an advantage when it is desired to have high strength and lower amount of bonding agent than is required without firing or where extra water resistance and less re-heat shrinkage is desired. The expense and time of manufacture for fired chemically bonded bricks is greater than for the unfired chemically bonded brick.

Figure 2:
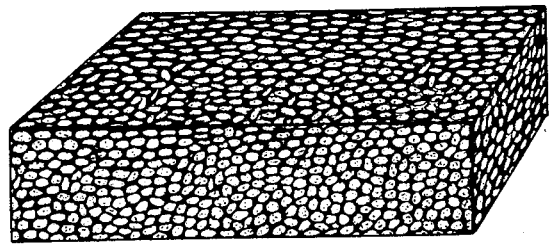

The accompanying drawing shows in Fig. 1 a diagrammatic flow sheet illustrating the preferred process of this invention. Figure 2 is a view in perspective of the vermiculite brick of this invention.

The following examples are given to illustrate the invention.

*Example 1.*—To 100 parts by weight of dry exfoliated vermiculite granules of particle size of −6 to +60 mesh (90% from −8 to +30) there was added 5 parts by weight of magnesium sulfate ($MgSO_4 \cdot 7H_2O$) in a 20% aqueous solution. The composition was mixed to give uniform distribution. There was then added 5 parts by weight of dry magnesium oxide (MgO) and this also uniformly blended. Next was added 10 parts by weight of 92% $H_2SO_4$ and 2 parts by weight of 75% $H_3PO_4$, the liquids being added slowly with mixing to get uniform wetting and distribution. The composition after blending was still substantially dry and flowable in granular form. It was added to the hopper of a dry press, the press then operated in the manner used for dry pressing clay bricks except that the pressure was much lower. For this particular run the pressure was 50 p.s.i. (50 pounds per square inch). The brick so formed was removed from the mold and dried at 700° F. for 15 hours.

The dried brick had a density of 24 lb. per cubic foot, a modulus of rupture of 100 p.s.i., compressive strength of 100 p.s.i. The brick had a linear shrinkage of only 1½% at 1900° F. The product did not disintegrate when placed in water at 100° C. for 12 hours and on removal and drying retained its density, strength, and shrinkage characteristics.

*Example 2.*—To 100 parts by weight of dry exfoliated vermiculite granules of particle size of −6 to +60 mesh (90% from −8 to +30) there was added 5 parts by weight of magnesium sulfate ($MgSO_4 \cdot 7H_2O$) in a 20% aqueous solution. The composition was mixed to give uniform distribution. Next was added 10 parts by weight of 92% $H_2SO_4$ and 2 parts by weight of 75% $H_3PO_4$, the liquids being added slowly with mixing to get uniform wetting and distribution. The composition after blending was still substantially dry and flowable in granular form. It was added to the hopper of a dry press, the press then operated in the manner used for dry pressing clay bricks except that the pressure was much lower. For this particular run the pressure was 50 p.s.i. (50 pounds per square inch). The brick so formed was removed from the mold and dried at 700° F. for 15 hours.

The dried brick had a density of 23.6 lb. per cubic foot, a modulus of rupture of 90 p.s.i., compressive strength of 100 p.s.i. The brick had a linear shrinkage of only 1.0% at 1900° F. The product did not disintegrate when placed in water at 100° C. for 12 hours and on removal and drying retained its density, strength, and shrinkage characteristics.

*Example 3.*—To 100 parts by weight of dry exfoliated vermiculite granules of particle size of −6 to +60 mesh (90% from −8 to +30) there was added 5 parts by weight of magnesium sulfate ($MgSO_4 \cdot 7H_2O$) in a 20% aqueous solution. The composition was mixed to give uniform distribution. Next was added 5 parts by weight of $H_3PO_4$ (75% $H_3PO_4$+25% water), the liquids being added slowly with mixing to get uniform wetting and distribution. The composition after blending was still substantially dry and flowable in granular form. It was added to hopper of a dry press, the press then operated in the manner used for dry pressing clay bricks except that the pressure was much lower. For this particular run the pressure was 50 p.s.i. (50 pounds per square inch). The brick so formed was removed from the mold and dried at 700° F. for 15 hours.

The dried brick has a density of 24 lb. per cubic foot, a modulus of rupture of 75+ p.s.i., compressive strength of 100 p.s.i. The brick had a linear shrinkage of 6% at 1900° F. The product did not disintegrate when placed in water at 100° C. for 12 hours and on removal and drying retained its density, strength, and shrinkage characteristics.

*Example 4.*—To 100 parts by weight of dry exfoliated vermiculite granules of particle size of −6 to +60 mesh (90% from −8 to +30) there was added 5 parts by weight of magnesium sulfate ($MgSO_4 \cdot 7H_2O$) in a 20% aqueous solution. The composition was mixed to give uniform distribution. Next was added 5 parts by weight $H_2SO_4$ (66° Bé.), the liquids being added slowly with mixing to get uniform wetting and distribution. The composition after blending was still substantially dry and flowable in granular form. It was added to the hopper of a dry press, the press then operated in the manner used for dry pressing clay bricks except that the pressure was much lower. For this particular run the pressure was 50 p.s.i. (50 pounds per square inch). The brick so formed was removed from the mold and dried at 700° F. for 15 hours.

The dried brick has a density of 24 lbs. per cubic foot, a modulus of rupture of 75+ p.s.i., compressive strength of 100 p.s.i. The brick had a linear shrinkage of only 5% at 1900° F. The water resistance was relatively poor compared to the products of the previous examples.

*Example 5.*—The process of Example 1 was repeated except that both the MgO and the $MgSO_4 \cdot 7H_2O$ were omitted. The dried brick had a density of 18 pounds per cubic foot. The modulus of rupture was 30 p.s.i. and the lineal shrinkage at 1900° F. was 2.8%. The water resistance was substantially the same as for the product of Example 1.

The following table, based on the examples, summarizes the effect of composition on the physical characteristics of the bricks, the values under the compositions being in part by weight.

*Table I*

| | Lineal Shrinkage 1,900° F. | Density, lb./cu. ft. | Vermiculite | $H_2SO_4$ | $H_3PO_4$ | $MgSO_4$ | MgO | Mod. Rupture (p.s.i.) | Compressive Strength (p.s.i.) |
|---|---|---|---|---|---|---|---|---|---|
| | *Percent* | | | | | | | | |
| 1 | 1.5 | 24.0 | 100 | 10 | 2 | 5 | 5 | 100 | 100 |
| 2 | 1.0 | 23.6 | 100 | 10 | 2 | 5 | 0 | 90 | 100 |
| 3 | 6.0 | 24.0 | 100 | 0 | 5 | 5 | 0 | 75 | 100 |
| 4¹ | 5.0 | 24.0 | 100 | 5 | 0 | 5 | 0 | 75 | 100 |
| 5 | 2.8 | 18.0 | 100 | 10 | 2 | 0 | 0 | 30 | ---- |

¹ The water resistance of No. 4 was relatively poor.

The reason for the good bond with sulfuric and phosphoric acids even with dry pressing at low pressures is believed due in part to the fact that the sulfuric acid and phosphoric acid being liquids are absorbed by the vermiculite and react with the vermiculite to give aluminum, iron and magnesium sulfates and phosphates. Under the pressure of shaping operations the materials form in adjacent vermiculite granules and produce interlocking crystals with resulting good bonding strength. The strength of the bond is due mainly to the formation of magnesium sulfate and magnesium phosphate formed by the reaction of the sulfuric and phosphoric acids with the magnesium oxides of the vermiculite. There is also some bonding action due to the formation of iron sulfates and iron phosphates from the iron oxide of the vermiculite and a substantial effect due to the formation of acid aluminum sulfate and phosphate from the alumina.

When magnesium sulfate and phosphate are present due to their incorporation in the vermiculite by adding an aqueous solution to these salts or by reaction of the acids with added MgO the bond is further reinforced by the interlocking and lattice filling of the magnesium sulfate and phosphate crystals of the reacted vermiculite with the magnesium sulfate and phosphate crystals introduced. Also the hot shrinkage is substantially reduced.

Insulating materials such as pumice or diatomaceous earth may be used in the practice of this invention. However, vermiculite is the most common and is particularly satisfactory. The chemical composition of these materials vary slightly and any may be used. The particular vermiculite used in the example had the following composition by weight.

| | |
|---|---|
| Silica | 41.00 |
| Iron oxide | 10.00 |
| Aluminum oxide | 15.00 |
| Magnesium oxide | 21.00 |
| Sodium oxide | .5 |
| Potassium oxide | .5 |
| Ignition loss | 11.00 |

The dry pressing process of making vermiculite block can be used with any bonding agent used to bind refractory material. Particularly suitable are liquids which either react with the vermiculite to form bonding agents, as is the case for $H_2SO_4$ and $H_3PO_4$, but also liquids which are solutions of bonding agents, such as for example, sodium silicate, ethylsilicate and the like. These latter bonding agents have a tendency to close the pores of the exfoliated vermiculite more than those which react with the walls of the exfoliated vermiculite.

Sodium silicate gives a vermiculite block or brick which can not withstand such high temperatures as the acid bonded vermiculite.

With sodium silicate the conditions for dry pressing must be carefully controlled. The sodium silicate can be used with the vermiculite in amounts from 2% to 15% (solid sodium silicate) but using aqueous solution such as 41 Bé. The press pressure is maintained at 20 to 200 p.s.i. It is important however that the particle size of the exfoliated vermiculite be from —3 to +60 mesh otherwise on removal from the press the bricks are weakened by re-expansion. Preferably, also the particle should be such that 90% of the particles are in a range where the diameter of the larger particles are not over 4 times the diameter of the smaller particles. Polymerized ethyl silicate, particularly when used with the acid binding agents can also be used to make strong bonded vermiculite bricks and such bricks have high heat resistance and low hot shrinkage.

The vermiculite blocks of this invention, are useful as insulation material for the walls of blast furnace stoves. They also can be used for insulating the side wall of open hearth checker chambers, and the walls of soaking pits (re-heat pits for ingots). Where the temperature is to exceed 1750° F. the acid bonded vermiculite blocks should be used instead of the sodium silicate bonded blocks.

Having thus described their invention, what applicants claim is:

1. The method of making a refractory insulating block from exfoliated vermiculite which comprises mixing with from 5 to 25% of sulphuric acid, from 1 to 10% of phosphoric acid, and from 2 to 8% of magnesium sulphate exfoliated vermiculite having a particle size between —3 mesh and +100 mesh in which the particles have a range of sizes such that 90% of the particles are in a range where the diameter of the larger particles are not more than 4 times the diameter of the smaller particles, the mixture having a liquid content of between 20 to 40% by weight, and pressing the mixture into the shape of a block at a pressure of between approximately 20 to 200 pounds per square inch and then heating the block at substantially above 212° F. but below the vitrification temperature of the vermiculite.

2. The method of claim 1 wherein the mixture contains at least 80% of exfoliated vermiculite.

3. The method of making a refractory, unfired insulating brick having low hot shrinkage from exfoliated vermiculite which comprises mixing together from 2 to 8% by weight of magnesium sulphate in aqueous solution with exfoliated vermiculite having a particle size finer than 3 mesh and coarser than 100 mesh, up to 10% by weight of magnesium oxide on the basis of the vermiculite, 5 to 15% by weight of sulfuric acid on the basis of the dry aggregate, 1 to 10% by weight of phosphoric acid on the basis of the dry aggregate, the total liquid content of the mixture being between 20% to 40%, pressing said mixture into the shape of a brick at a pressure of between 20 to 200 pounds per square inch, and then heating the brick at substantially above 212° F. but below the vitrification temperature of the vermiculite.

4. A refractory insulating brick consisting essentially of 2 to 8% of magnesium sulphate and at least 80% by weight of granules of exfoliated vermiculite having a particle size finer than 3 mesh and coarser than 100 mesh, said vermiculite granules being bonded together by sulfates and phosphates formed by the reaction of 5 to 25% of sulfuric acid and 1 to 10% of phosphoric acid with the alkaline oxides of the vermiculite.

References Cited in the file of this patent

UNITED STATES PATENTS

| | | |
|---|---|---|
| 1,962,577 | Wolochow | June 12, 1934 |
| 2,130,091 | Kershaw | Sept. 13, 1938 |
| 2,328,644 | Happe et al. | Sept. 7, 1943 |
| 2,481,390 | Campbell et al. | Sept. 6, 1949 |
| 2,592,521 | Thompson | Apr. 8, 1952 |

UNITED STATES PATENT OFFICE

CERTIFICATE OF CORRECTION

Patent No. 2,919,202                 December 29, 1959

John C. Ekedahl et al.

It is hereby certified that error appears in the printed specification of the above numbered patent requiring correction and that the said Letters Patent should read as corrected below.

Column 2, line 27, for "20% to 50%" read -- 20% to 40% --.

Signed and sealed this 19th day of July 1960.

(SEAL)
Attest:

KARL H. AXLINE                    ROBERT C. WATSON
Attesting Officer                Commissioner of Patents